(12) United States Patent
Harton et al.

(10) Patent No.: US 8,132,929 B2
(45) Date of Patent: Mar. 13, 2012

(54) VISUAL MORPHING USING DIRECTIONALLY SELECTIVE MICROPRISMS

(75) Inventors: Austin Vincent Harton, Oak Park, IL (US); Manuel Oliver, Scottsdale, AZ (US)

(73) Assignee: Motorola Mobility, Inc., Libertyville, IL (US)

( * ) Notice: Subject to any disclaimer, the term of this patent is extended or adjusted under 35 U.S.C. 154(b) by 436 days.

(21) Appl. No.: 12/416,667

(22) Filed: Apr. 1, 2009

(65) Prior Publication Data

US 2010/0254158 A1    Oct. 7, 2010

(51) Int. Cl.
*F21V 33/00* (2006.01)
(52) U.S. Cl. .............. 362/85; 362/249.01; 362/249.02; 362/620; 340/815.55; 40/546
(58) Field of Classification Search .............. 362/85–88, 362/227, 230, 231, 235, 236, 240, 244–247, 362/249.01, 249.02, 249.06, 276, 326–328, 362/330, 336, 337, 559–561, 600, 601–607, 362/610–627, 631–633, 800, 802; 340/815.45, 340/815.55; 40/541, 546, 563
See application file for complete search history.

(56) References Cited

U.S. PATENT DOCUMENTS

| | | | | |
|---|---|---|---|---|
| 5,150,965 A * | 9/1992 | Fox | | 362/260 |
| 6,454,452 B1 * | 9/2002 | Sasagawa et al. | | 362/561 |
| 6,539,656 B2 * | 4/2003 | Maas et al. | | 40/546 |
| 6,671,013 B1 * | 12/2003 | Ohkawa | | 349/62 |
| 6,745,506 B2 * | 6/2004 | Maas et al. | | 40/546 |
| 6,834,973 B2 * | 12/2004 | Ohkawa | | 362/617 |
| 6,926,418 B2 | 8/2005 | Ostergard et al. | | |
| 6,939,019 B2 * | 9/2005 | Choi et al. | | 362/613 |
| 7,108,414 B2 * | 9/2006 | McCollum et al. | | 362/604 |
| 7,553,057 B2 * | 6/2009 | Hwang et al. | | 362/607 |
| 7,614,777 B2 * | 11/2009 | Koganezawa et al. | | 362/620 |
| 2005/0111240 A1 * | 5/2005 | Yonekubo | | 362/617 |
| 2005/0259939 A1 | 11/2005 | Rinko | | |
| 2005/0265029 A1 | 12/2005 | Epstein et al. | | |

* cited by examiner

Primary Examiner — Hargobind S Sawhney (57) ABSTRACT

An optical waveguide (106) with directional microprisms (116) and multidirectional light sources (110)(112) are provided for providing overlapping morphing images (104) and information (102) on a display (124) of a touch screen mobile phone or other electronic device (100). Microprisms can be patterned in the shape of a particular design, character, icon or other image. The microprisms can include: first microprisms (118) sensitive to light propagating in only one direction; second microprisms (120) sensitive to light propagating in a different direction, and a third microprisms (122) sensitive to light propagation in multiple directions. When light is directed into the waveguide (106) in a direction to which a portion of the microprisms (116) are sensitive, a fraction of that light will be directed upward and out of the waveguide (106) by those microprisms sensitive to light propagated in that direction. Controlling, switching or selectively activating the light sources (110)(112) results in different images (104) which are displayed and illuminated on the display (124) of the electronic device (100).

9 Claims, 7 Drawing Sheets

VISUAL MORPHING USING DIRECTIONALLY SELECTIVE MICROPRISMS

BACKGROUND OF THE INVENTION

1. Field of the Disclosure

The disclosure relates to electronic devices, and more particularly, to displaying overlapping characters which can be used as indicators in hand held electronic devices and other electronic devices.

2. Background Art

Waveguides have been used with multiple light sources of different wavelengths. Color filters of the appropriate pattern are placed in front of the waveguide. Selection of the wavelength of the light source determines which graphics are presented to the user. The disadvantage of this approach is that different graphics must have different colors and therefore limits design freedom. For example, for some products, it is desirable to have different graphics that are both white or of the same color. This cannot be achieved with conventional color filter based methods.

Furthermore, in the past, multiple waveguide layers have been used with each layer capable of providing different graphical information. The challenge with this approach is that is thicker and in the case of overlapping graphics can have problems or difficulties in providing a clear, distinct image for graphics from the lower layers.

Over the years various hand held electronic devices and other electronic devices, have been developed or suggested, such as hand held communication devices, including radiotelephones, cellular (cell) phones, mobile phones, smart phones, camera phones, personal digital assistants (PDAs), wireless devices, two way pagers, touch screen mobile devices, cameras, video cam corders, computer, microprocessors, and other central processing units. These conventional hand held electronic devices and other electronic devices have met with various degrees of success.

Many conventional electronic devices have small displays which are difficult to read as well as difficult to input information or data via a touch screen. Some newer hand held electronic devices have a large display with a touch screen having a touch sensitive input surface.

It is desirable to have overlapping characters or images which can be used as indicators in electronic devices for better viewing and use of the electronic device.

It is also desirable to provide an improved method and electronic device which overcomes most, if not all, of the preceding problems.

SUMMARY OF THE INVENTION

An improved electronic device and method are provided for displaying overlapping images for use as indicators which are user-friendly, reliable and effective. The novel electronic device and method provides visual morphing using directionally selective microprisms. Advantageously, the inventive electronic device and method are, efficient, simple to use and economical. Desirably, the convenient method and electronic device do not depend on illumination light wavelength to attain visual morphing and overlapping of images and can be applicable using white light of other color mixes. The special method and electronic device can also provide improved resolution and viewing angle advantages. Also, the user friendly electronic device with directional lighting can enable selection extraction or viewing of images. Desirably, two or more images can be displayed and the images can be switched by changing the light direction. The visually appealing electronic device and method can use orthogonal or multidirectional lighting.

The novel method and electronic device displays overlapping icons, characters, or other images individually using an array of microprisms in a waveguide. The array of microprisms is designed to be sensitive to light propagating in a specific direction and can be patterned in the shape of a particular character, design or other image. This array can be intermingled with another array of microprisms sensitive to light propagating in a different general direction. The other array of microprisms can be patterned in the shape of a different character, design or other image. Regions of the co-mingled arrays which can be sensitive to light propagating in all directions can have microprisms designed to be sensitive to light propagating in all directions. When light is injected or directed into the waveguide in a direction to which a portion of the array is sensitive, a fraction of that light will be directed upward and out of the waveguide by those microprisms sensitive to it. Light impinging on microprisms designed not to be sensitive to this light is reflected in a direction which results in the light continuing to propagate in the waveguide via total internal reflection.

The inventive method and electronic device can use only a single layer, planar waveguide in which two or more light sources can be attached to the waveguide. Directional microprisms can be formed in the planar waveguides. Selection of the light source determines which graphical information and images are illuminated to the user.

Significant aspects, feature and/or advantages of the method and electronic device can include: (1) A thin electronic device which can require only a single waveguide layer; (2) A visually attractive display which is wavelength independent; (3) The principle of operation is based on the geometry of the prism not the wavelength of the light; (4) The light sources can be monochromatic (single color) or broadband (white) sources; (5) Accommodates overlapping graphics so that two or more sources of graphical information or other images can overlap. To sharpen the output, opaque regions to provide even clearer distinct images can be printed on top of the waveguide or on a separate top layer. While it is preferred that there are two light sources that are orthogonal to each other, three or more light sources, such as spread apart 60 degrees, can be used. Furthermore, waveguide layers can be stacked, if desired, to create additional illumination states, preferably with non-overlapping graphics. Moreover, the microprisms can be formed by embossing or molding. Also, the microprisms can be metalized to enhance reflectivity In the inventive method and electronic device, information from images can be displayed. An optical waveguide comprising only a single layer substantially planar waveguide can be provided. At least two different light sources can be provided including: a first light source for propagating light in a first direction defining a Y direction and a second light source for propagating light in a second direction defining a Z direction. The Y direction can be at an angle of inclination to the Z direction. Directional optical microprisms can be provided on the waveguide. The microprisms can comprise: (1) a first array of microprisms comprising Y directional microprisms for emitting light only in the first direction defining a Y direction; (2) a second array of microprisms comprising Z directional microprisms for emitting light only in the second direction defining a Z direction; and (3) a third array of microprisms comprising YZ directional microprisms for emitting light in the first and second direction defining the Y and Z directions.

The electrical device can have a display, such as a user interface, touch screen, or a display screen.

In use, light can be propagated and directed in the first direction defining the Y direction from the first light source into the waveguide, such as into a first edge of the waveguide. Light can be emitted from the first and third arrays of microprisms out of the waveguide in response to light propagating in the Y direction from the first light source.

Light can be propagated and directed in the second direction defining the Z direction from the second light source into the waveguide, such as into a second edge of the waveguide, in which the first and second edges are at an angle of inclination to each other. Light can be emitted from the second and third arrays of microprisms out of the waveguide in response to light propagating in the Z direction from the second light source.

Desirably, a first array of images can be displayed and illuminated on the display of the electronic device in response to light emitted from the first and third arrays of microprisms when light is propagated in the Y direction from the first light source. A second array of images can be displayed and illuminated on the display of the electronic device in response to light emitted from the second and third arrays of microprisms when light is propagated in the Z direction from the second light source The novel electronic device and method as described and claimed herein achieves unexpected surprisingly good results.

A more detailed explanation of the invention is provided in the following description and appended claims.

DETAILED DESCRIPTION OF THE INVENTION

The following is a detailed description of the preferred embodiment of the invention and best mode for practicing the invention.

While this invention is susceptible of embodiment in many different forms, there is shown in the drawings and described herein in detail, specific embodiments of the invention with the understanding that the present disclosure is to be considered as an exemplification and is not intended to be limited to the illustrated embodiments.

It will be understood that the drawings are merely representations of the invention, and some of the parts and components may have been distorted from actual scale for purposes of pictorial clarity.

Referring to FIGS. 1-8 of the drawings, an electronic device 100 is shown for providing information 102 and displaying images 104. The images displayed can be graphics, text, numbers, alpha numeric images, characters, icons, designs, logos, or combinations thereof. The electronic device can have an optical waveguide 106 comprising only a single layer substantially planar waveguide. The waveguide can have parallel elongated longitudinal edges 108 and 109, which can provide first and third edges. The waveguide can also have parallel transverse edges 110 and 111, which can provide second and fourth edges. The longitudinal edges can be orthogonal, perpendicular or at right angles to the transverse edges.

At least two different light sources 112 and 114 which can comprise multidirectional light sources can be provided, such as a first light source 112 which can provide a Y directional light source for propagating light in a first direction defining a Y direction and a second light source 114 which can provide a Z directional light source for propagating light in a second direction defining a Z direction. The Y direction can be at an angle of inclination to the Z direction, preferably at right angles or 90 degrees, so as to be orthogonal and perpendicular to each other. One or more of the light sources can be a monochromatic light source for propagating light of a single color or can be a broadband light source for propagating white light, or can be of mixed colors or multiple wavelengths. One or more of the light sources can be a light-emitting diode (LED). The light sources can be in different colors or different wavelengths so that the images can be in different colors.

Matrices providing patterns or groups of directional optical microprisms 116 are created in the waveguide. The microprisms can comprise: a first array and set of first microprisms 118 comprising Y directional microprisms for emitting light only in the first direction defining a Y direction; a second array and set of second microprisms 120 comprising Z directional microprisms for emitting light only in the second direction defining a Z direction; and a third array and set of third microprisms 122 comprising YZ directional microprisms for emitting light in the first and second direction defining the Y and Z directions. The Y directional microprisms, Z directional microprisms and YZ directional microprisms can be intermingled and mixed or intermixed to form patterns of images when the first and second light sources are activated, as well as to provide morphing of the images emitted from the microprisms. The microprisms can be formed by embossing or molding. Furthermore, the microprisms can be tent-shaped microprisms and/or pyramid-shaped microprisms. In some circumstances, it may be desirable to use other shaped microprisms.

Figure 1:
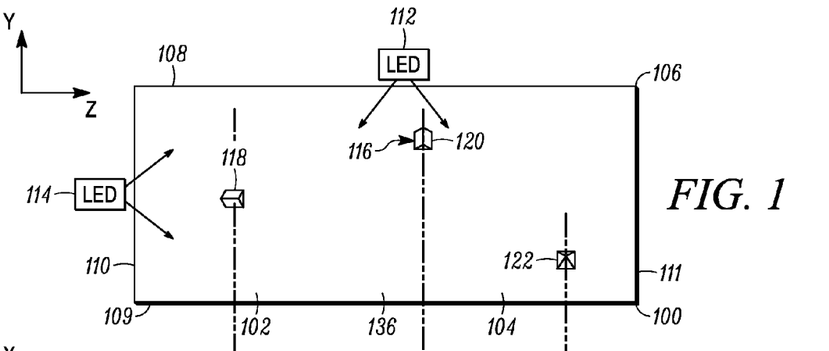
FIG. 1 is a diagrammatic view of an electronic device with an optical waveguide and directional microprisms with Y and Z directional light sources (LEDs) as viewed in the YZ direction in accordance with principle of the present invention and illustrating operation of individual microprisms when both light sources are activated (on).
Figure 2:
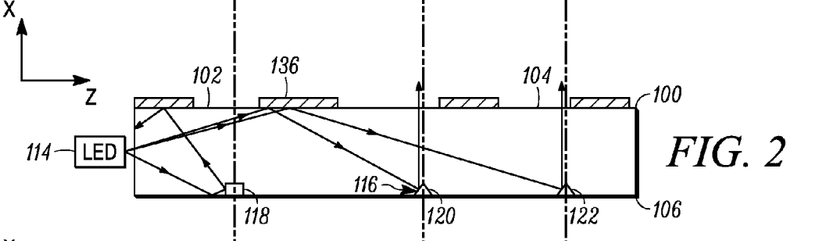
FIG. 2 is a diagrammatic view of the electronic device with the optical waveguide and directional microprisms with the Z directional light source as viewed in the XZ direction.
Figure 3:
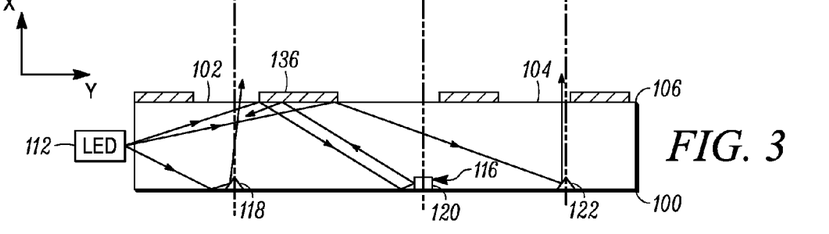
FIG. 3 is a diagrammatic view of the electronic device with the optical waveguide and directional microprisms with the Y directional light source as viewed in the XY direction.
Figure 4:
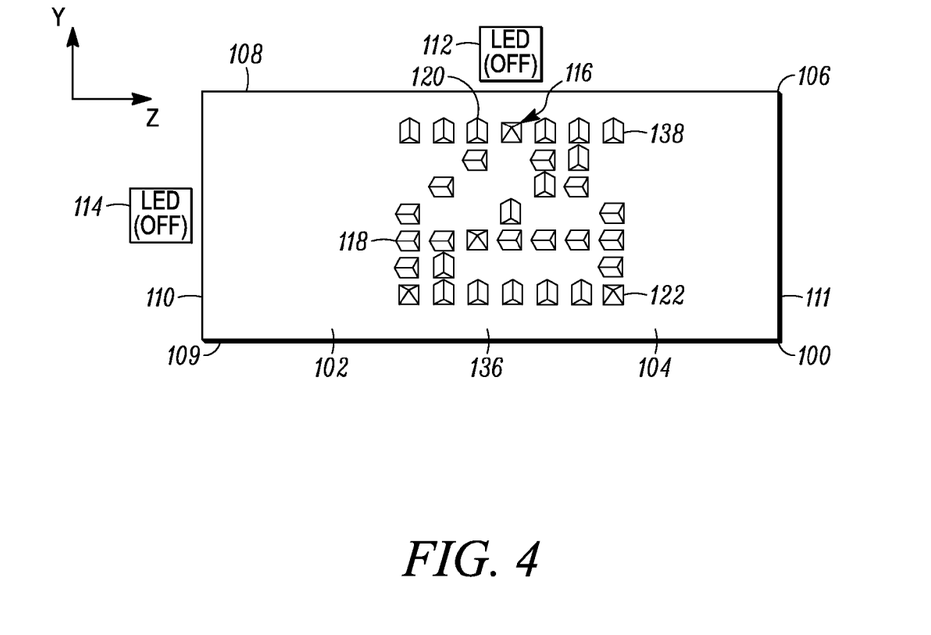
FIG. 4 is a diagrammatic view of the electronic device with the optical waveguide and more directional microprisms with both light sources (LEDs) off and illustrating selecting overlapping images (icons) as viewed in the YZ direction.
Figure 5:
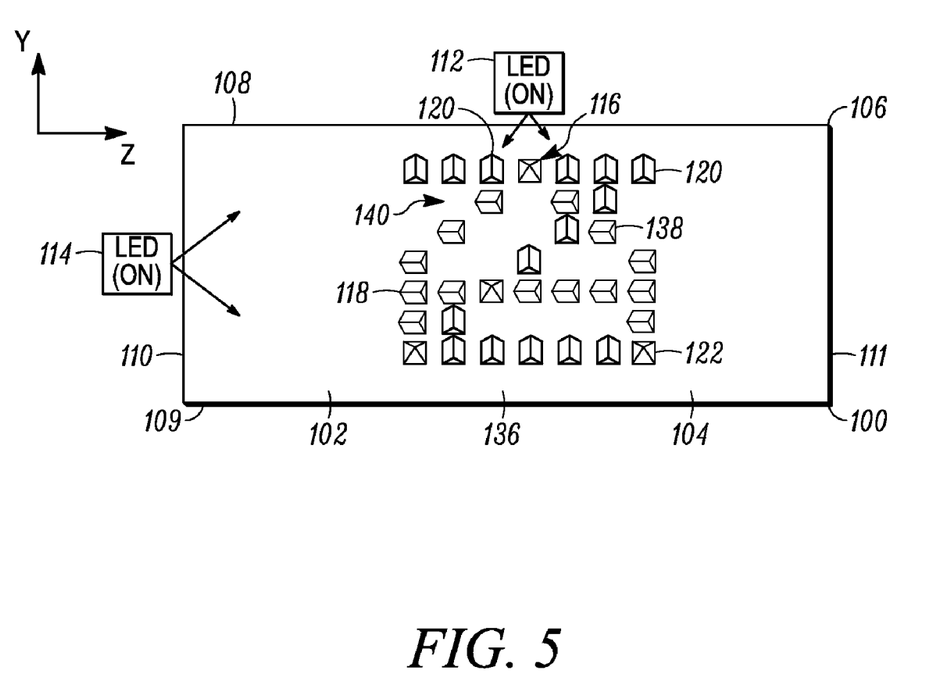
FIG. 5 is a diagrammatic view of the electronic device with the optical waveguide and directional microprisms with both light sources (LEDs) activated (on) and illustrating selecting overlapping images (icons) as viewed in the YZ direction.
Figure 6:
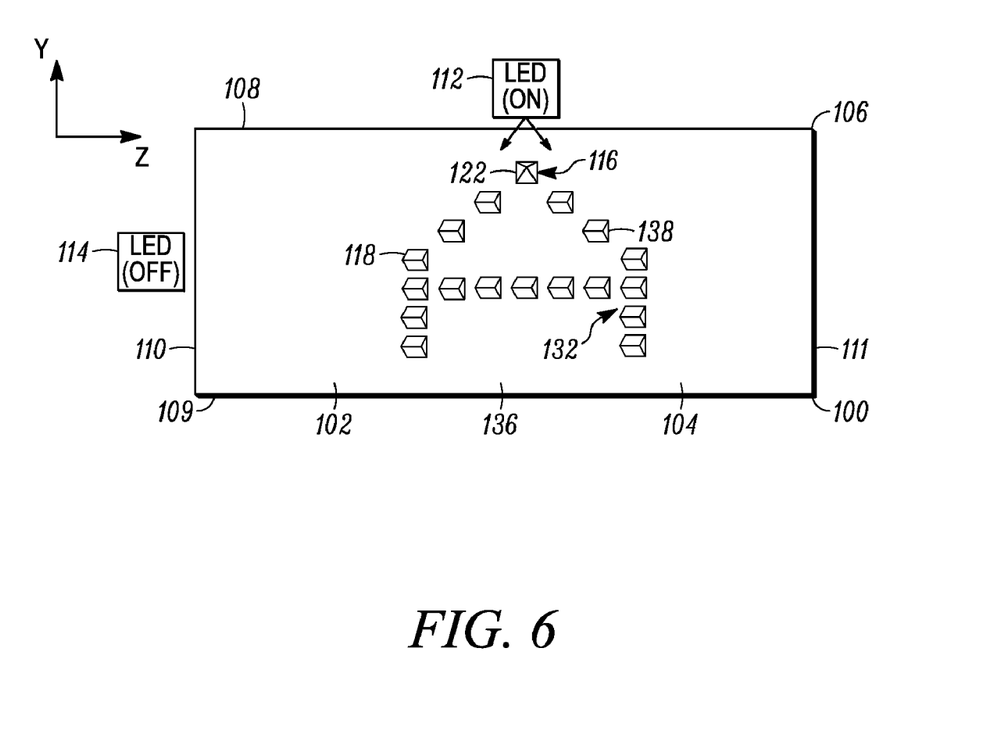
FIG. 6 is a diagrammatic view of the electronic device with the optical waveguide and directional microprisms with only the Y directional light source (LED) on and illustrating selecting overlapping images (icons) as viewed in the YZ direction.
Figure 7:
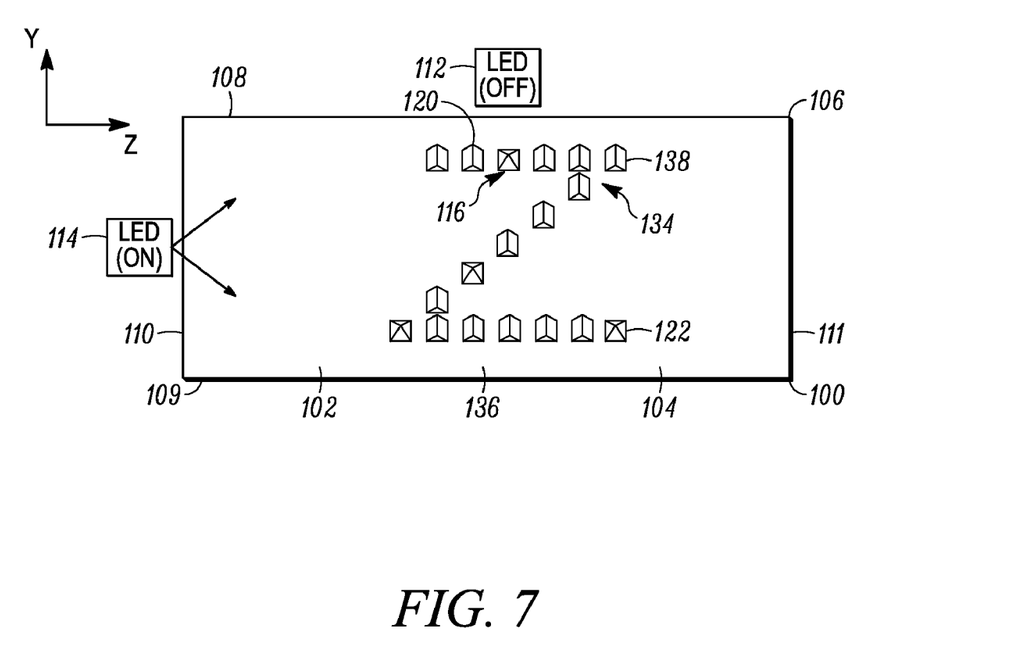
FIG. 7 is a diagrammatic view of the electronic device with the optical waveguide and directional microprisms with only the Z directional light source (LED) on and illustrating selecting overlapping images (icons) as viewed in the YZ direction.
Figure 8:
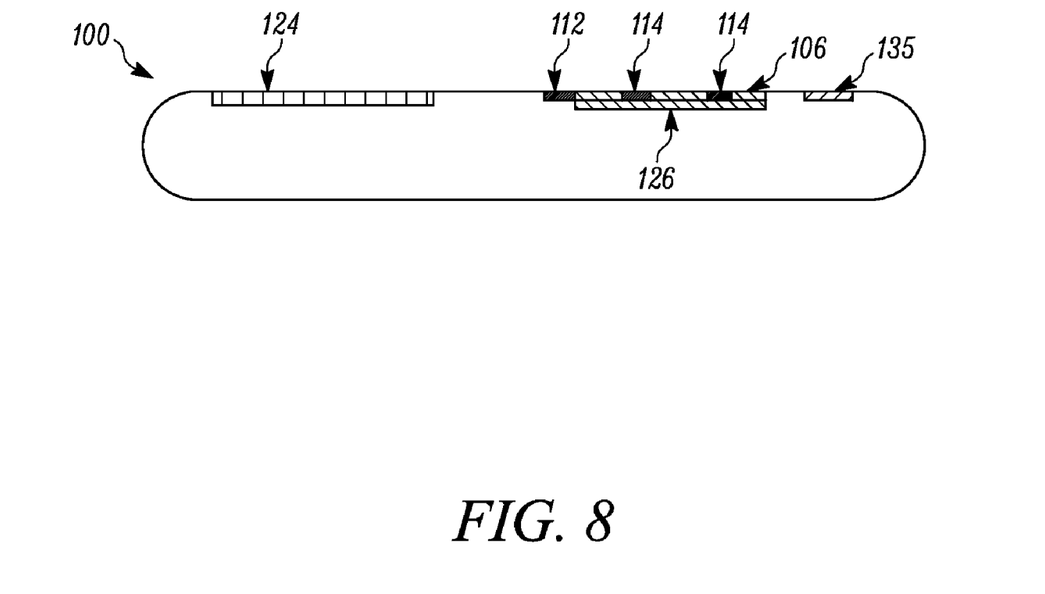
FIG. 8 is a cross-sectional view of the electronic device.
Figure 9:
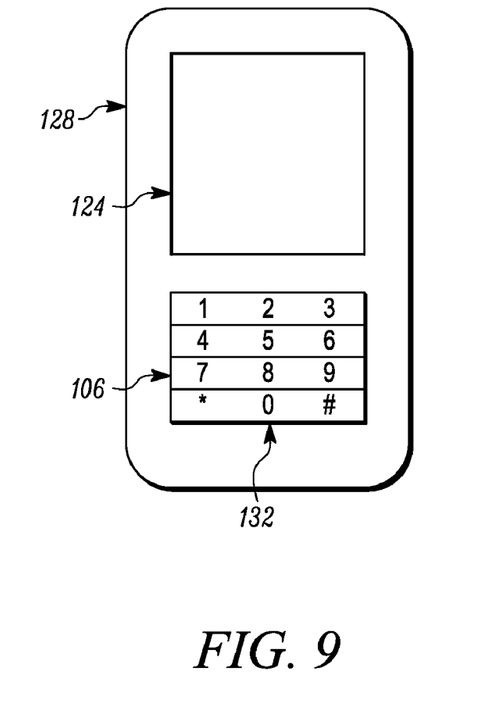
FIG. 9 is a front view of the electronic device and showing a first image.
Figure 10:
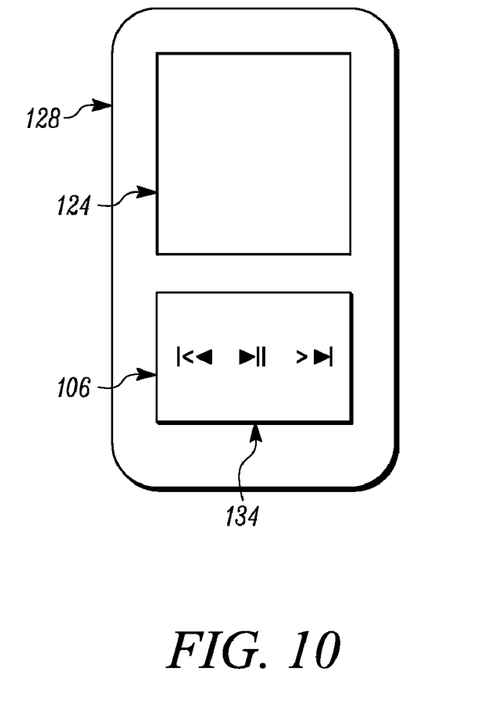
FIG. 10 is a front view of the electronic device and showing a second image.

The electronic device can also have a touch sensor 126 that is used in conjunction with the waveguide 106 and light sources 112 and 114 (FIG. 8). In situations where the images presented on the waveguide are designed for user input the touch sensor captures the user input and modifies the operation of the device or information presented on the display 124. The electronic device can have a housing 128 (FIGS. 9 and 10). Furthermore, the electronic device be a handheld electronic device, such as a cellular phone, mobile phone, camera phone, smart phone, personal digital assistant (PDA), an electronic device with a clamshell configuration, mobile communications device, wireless device, wireless e-mail device, two way pager, touch screen mobile device, camera, video cam corder, computer, microprocessor, central processing unit, or combinations thereof.

A first array, set and matrix of images 132 (FIG. 6) can be displayed and illuminated on the display of the electronic device in response to light emitted from the first and third arrays of microprisms when light is propagated in the Y direction from the first Y directional light source. A second array, set and matrix of images 134 (FIG. 7) can be displayed and illuminated on the display of the electronic device in response to light emitted from the second and third arrays of microprisms when light is propagated in the Z direction from the second Z directional light source. As previously indicated, the images displayed can be graphics, text, numbers, alpha numeric images, characters, icons, designs, logos, or combinations thereof.

Significantly, the images displayed and illuminated on the display are based upon the geometry of the microprisms displaying the images rather than the wavelength and color of the light being propagated by the light sources and rather than the viewing angle of the images displayed and illuminated on the display of the electronic device.

A controller 135 (FIG. 8) can be provided to control the images to be displayed and illuminated on the display of the electronic devices by selectively activating only the first light source, or only the second light source, or both of the light sources.

The method and process of using the electronic device with the optical guide and directional microprisms and directional light sources, can comprise propagating, directing and injecting light in the first direction defining the Y direction from the first Y directional light source into the first edge of the optical waveguide. Light is emitted from the first and third arrays and sets of microprisms out of the waveguide in response to light propagating in the Y direction from the first Y directional light source.

The method and process of using the electronic device with the optical guide and directional microprisms and light sources, also can comprise propagating, directing and injecting light in the second direction defining the Z direction from the second Z directional light source into the second waveguide. The Y direction is a different direction than the Z direction, such as orthogonal or perpendicular to the Z direction. Light is emitted from the second and third arrays and sets of microprisms out of the waveguide in response to light propagating in the Z direction from the second Z directional light source.

A first array and set of images can be displayed and illuminated on the display of the electronic device in response to light emitted from the first and third arrays and sets of microprisms when light is propagated in the Y direction from the first Y directional light source. A second array and set of images can be displayed and illuminated on the display of the electronic device in response to light emitted from the second and third sets of microprisms when light is propagated in the Z direction from the second Z directional light source.

Viewing of the images can be enhanced and sharpened for even clearer, more distinct images by using at least one opaque region 136 (FIGS. 1 and 4-7) with the waveguide. The opaque region can be formed by masking a top of the waveguide or by using a separate layer with opaque regions on top of the waveguide.

Reflectivity can be enhanced by using metalized microprisms 138 (FIGS. 4-7). Additional illumination can be created by stacking waveguide layers.

In some circumstances, it may be desirable to propagate light from at least three light sources, preferably three different directional light sources, such as, but not limited to, light sources which are positioned at 60 degrees from each other.

The electronic device and method can display and illuminate overlapping images 140 (FIG. 5) for use as indicators, and can provide visual morphing using directionally selective microprisms. The electronic device and method does not depend on illumination light wavelength and can be applicable using white light of other color mixes. The electronic device and method can also provide improved resolution and viewing angle advantages. Furthermore, the method and electronic device with directional lighting can provide selective extraction or viewing of images. Desirably, two or more images can be displayed and the images can be switched by changing the illumination source which determines the direction of the light being propagated.

The novel method and electronic device displays overlapping icons, characters, or other images individually using array and sets of microprisms in the waveguide. The arrays and sets of microprisms are designed to be sensitive to light propagating in a specific direction and can be patterned in the shape of a particular character or other image. The arrays and sets of microprisms can be intermingled with other arrays and sets of microprisms sensitive to light propagating in a different direction and patterned in the shape of a different character or other image. Regions of the co-mingled and intermixed arrays can also include microprisms which can be sensitive to light propagating in all directions. When light is injected or directed into the waveguide in a direction to which a portion of the array is sensitive, a fraction of that light can be directed upward and out of the waveguide by those microprisms sensitive to it. Light impinging on and striking microprisms designed not to be sensitive to this light can be reflected in a direction which results in that light continuing to propagate in the waveguide by total internal reflection.

The inventive method and electronic device can provide graphical information using only a single layer, planar waveguide in which two or more light sources can be attached or secured to the waveguide. Directional microprisms can be formed in the planar waveguides. Selection of the light source determines which graphical information and images are illuminated to the user.

Among the many advantages of the inventive display structure for electronic devices are:

1. Outstanding display and illumination of information and images.
2. Superior visual morphing of images.
3. A thin electronic device which can have only a single waveguide layer
4. A visually attractive display which is wavelength independent.
5. The principle of operation is based on the geometry of the microprisms and not the wavelength of the light.
6. The light sources can be monochromatic (single color) or broadband (white).

7. Accommodation of overlapping graphics so that two or more sources of graphical information or other images can overlap.

8. Capability of having overlapping icons and other images using a single waveguide.

9. Character and image selection is independent of LED color or color and wavelength of the light propagating from the light source.

10. The display is independent of the viewing angle, which is not the case when using lenticular lenses or similar optical methods.

11. Resolution of the information and images can be very high, such as 600 dots per inch or better.

12. The selectivity of individual images is excellent with highly divergent LEDs, such as greater than 110 degrees FWHM.

13. The arrays, sets and matrices of microprisms can be arranged and designed to achieve highly uniform illumination.

14. Superior capability.
15. Superb performance.
16. Reliable.
17. Light weight.
18. Portable.
19. User friendly.
20. Easy to use.
21. Comfortable.
22. Compact.
23. Convenient.
24. Durable
25. Economical.
26. Attractive.
27. Efficient.
27. Effective.

Although embodiments of the invention have been shown and described, it is to be understood that various modifications, substitutions, and rearrangements of parts, components, and method steps, as well as other uses of the electronic device and method, can be made by those skilled in the art without departing from the novel spirit and scope of this invention. The preceding description merely explains and illustrates the invention and the invention is not limited thereto except insofar as the appended claims are so limited.

What is claimed is:

1. A method for providing information from images displayed in an electronic device, comprising the steps of:
    providing a mobile electronic device with a display consisting of a user's interface, a touch screen and a display screen;
    providing an optical waveguide comprising only a single layer substantially planar waveguide in the mobile electronic device;
    providing at least two different light sources in the mobile electronic device including a first light source for propagating light in a first direction defining a Y direction and a second light source for propagating light in a second direction defining a Z direction, said Y direction being at an angle of inclination to the Z direction;
    providing directional optical microprisms on the waveguide, said microprisms comprising
        a first array of microprisms comprising Y directional microprisms for emitting light only in the first direction defining a Y direction;
        a second array of microprisms comprising Z directional microprisms for emitting light only in the second direction defining a Z direction; and
        a third array of microprisms comprising YZ directional microprisms for emitting light in the first and second direction defining the Y and Z directions;
    propagating light in the first direction defining the Y direction from the first light source into the waveguide;
    emitting light from the first and third arrays of microprisms out of the waveguide in response to light propagating in the Y direction from the first light source;
    propagating light in the second direction defining the Z direction from the second light source into the waveguide;
    emitting light from the second and third arrays of microprisms out of the waveguide in response to light propagating in the Z direction from the second light source;
    displaying a first array of images on the display of the mobile electronic device in response to light emitted from the first and third arrays of microprisms when light is propagated in the Y direction from the first light source; and
    displaying a second array of images on the display of the mobile electronic device in response to light emitted from the second and third arrays of microprisms when light is propagated in the Z direction from the second light source.

2. The method of claim 1 wherein at least one of the light sources is selected from the group consisting of:
    a broadband light source for propagating white light;
    a monochromatic light source for propagating light of a single color; and
    a light emitting diode (LED).

3. The method of claim 1 wherein the images displayed on the display of the electronic device are based upon the geometry of the microprisms displaying the images rather than the wavelength and color of the light being propagated and rather than the viewing angle of the image displayed on the display of the electronic device.

4. The method of claim 1 including overlapping the first and second images when the first and second light sources are activated and propagating light.

5. The method of claim 1 wherein:
    said mobile electronic device is a handheld electronic device selected from the group consisting of with a cellular phone, mobile phone, smart phone, camera phone, personal digital assistant, an electronic device with a clamshell configuration, mobile communications device, wireless device, wireless e-mail device, two way pager, touch screen mobile device, camera, video camcorder, computer, microprocessor, central processing unit, and combinations thereof; and
    the images are selected from the group consisting of graphics, texts, numbers, alpha numeric images, characters, icons, designs, logos, and combinations thereof.

6. The method of claim 1 wherein the microprisms are selected from the group consisting of tent-shaped microprisms, pyramid-shaped microprisms, embossed, microprisms, molded microprisms, and combinations thereof.

7. An electronic device for providing information and displaying images, comprising:
    a handheld electronic device comprising
        a display comprising a touch screen;
        an optical waveguide comprising only a single layer substantially planar waveguide;
        at least two different light sources including a first light source for propagating light in a first direction defining a Y direction and a second light source for propagating light in a second direction defining a Z direction, said Y direction being at an angle of inclination to the Z direction;

said touch screen including a touch sensor used in conjunction with said optical waveguide, light sources and said display, matrixes of directional optical microprisms on said optical waveguide, said matrixes of microprisms comprising a first array of microprisms comprising Y directional microprisms for emitting light only in the first direction defining a Y direction;

a second array of microprisms comprising Z directional microprisms for emitting light only in the second direction defining a Z direction; and a third array of microprisms comprising YZ directional microprisms for emitting light only in the first and second direction defining the Y and Z directions;

a first array of images illuminating the display of the electronic device in response to light emitted from the first and third arrays of microprisms when light is propagated in the Y direction from the first light source; and a second array of images illuminating the display of the electronic device in response to light emitted from the second and third arrays of microprisms when light is propagated in the Z direction from the second light source.

8. The electronic device of claim 7 wherein:

said handheld electronic device is selected from the group consisting of with a cellular phone, mobile phone, smart phone, camera phone, personal digital assistant, an electronic device with a clamshell configuration, mobile communications device, wireless device, wireless e-mail device, a two way pager, and combinations thereof;

the images illuminated on said display are based upon the geometry of the microprism displaying the images rather than the wavelength and color of the light being propagated and rather than the viewing angled of the image illuminated on the display; and the images are selected from the group consisting of graphics, text, numbers, alpha numeric images, characters, icons, designs, logos, and combinations thereof.

9. The electronic device of claim 7 wherein:

at least one of said light sources are selected from the group consisting of a monochromatic light source for propagating light of a single color, a broadband light source for propagating white light, and a light-emitting diode (LED); and the first and second light sources are orthogonal to each other.

\* \* \* \* \*